United States Patent [19]
Laurenzo et al.

[11] Patent Number: 5,968,365
[45] Date of Patent: Oct. 19, 1999

[54] PREPARATION OF INULIN PRODUCTS

[75] Inventors: Kathleen S. Laurenzo; Juan L. Navia; David S. Neiditch, all of Athens, Ga.

[73] Assignee: McNeil-PPC, Inc., Skillman, N.J.

[21] Appl. No.: 08/783,085

[22] Filed: Jan. 15, 1997

Related U.S. Application Data

[60] Provisional application No. 60/011,104, Feb. 5, 1996.
[51] Int. Cl.$^6$ .................................................. B01D 61/00
[52] U.S. Cl. .......................... 210/641; 210/638; 210/651; 210/660; 210/774; 127/48; 127/55; 435/101
[58] Field of Search ...................................... 210/651, 641, 210/767, 774, 660, 638; 127/29, 30, 43, 54, 39, 55, 34; 435/15, 101; 426/573, 658

[56] References Cited

U.S. PATENT DOCUMENTS

| | | | |
|---|---|---|---|
| 4,285,735 | 8/1981 | Mitchell et al. | 127/29 |
| 4,421,852 | 12/1983 | Hoehn et al. | 127/30 |
| 4,613,377 | 9/1986 | Yamazaki et al. | 127/39 |
| 4,707,839 | 11/1987 | Koerts et al. | 210/651 |
| 5,039,420 | 8/1991 | Klein et al. | 210/651 |
| 5,051,408 | 9/1991 | Cooper | 514/1.1 |
| 5,145,584 | 9/1992 | Swamikannu | 210/650 |
| 5,478,732 | 12/1995 | Kunz et al. | 435/101 |
| 5,561,226 | 10/1996 | Nitsch | 536/128 |
| 5,672,482 | 9/1997 | Kushibe et al. | 435/15 |

FOREIGN PATENT DOCUMENTS

WO 91/18000 11/1991 WIPO.
WO 92 13005 8/1992 WIPO.

OTHER PUBLICATIONS

R.J. Thomann et al., "Recent Investigation on the Fractionation and Use of Products from Jerusalem Artichoke" A. Fuchs Editor, Fith Seminar on Inulin, Oct. 27, 1995, pp. 65–66.
Database WPI/Derwent; Derwent Publications Ltd., London, GB; AN 66213X; XP002058197 *abstract*.
Patent Abstracts of Japan; EPO; "Production of Fructan Composition" (Applicant—Ajinomoto Co. Inc.); vol. 16, No. 106 (C–919), Mar. 16, 1992 *abstract*.
E. Berghofer et al.; "Pilot–scale production of inulin from chicory roots and its use in foodstuffs" 1993, Elsivier, Amsterdam XP002058196.

*Primary Examiner*—Ana Fortuna
*Attorney, Agent, or Firm*—Ellen Ciambrone Coletti

[57] ABSTRACT

A process is described for clarifying a crude inulin extract by ultrafiltration and separating an aqueous inulin solution containing carbohydrates having a range of degrees of polymerization into fractions having different average degrees of polymerization which comprises subjecting an aqueous inulin solution to ultrafiltration through a membrane having a predetermined pore size whereby inulin fractions having average degrees of polymerization less than a predetermined value pass through said membrane as permeate and inulin fractions having average degrees of polymerization greater than said predetermined value are collected as retentate.

14 Claims, No Drawings

PREPARATION OF INULIN PRODUCTS

CROSS-REFERENCE TO RELATED APPLICATIONS

This application claims priority from copending provisional application Ser. No. 60/011,104, filed on Feb. 5, 1996.

The invention relates to the preparation of products from inulin.

BACKGROUND OF THE INVENTION

Inulin is a naturally occurring fructo-oligosaccharide composed of a mixture of oligomers of varying degrees of polymerization ("DP") or molecular weights that occurs naturally plants such as onion, garlic, Jerusalem artichoke, dahlia and chicory for plant energy storage. The inulin produced from different plants, at different stages in the growing cycle of a plant, or under different climatic conditions, will normally have different average DP's.

One of the limitations that face the industry now, namely, that an entire crop of roots must be harvested and processed within 2 months to get the inulin before it is broken down to fructose. The present situation (using the prior art techniques) requires a large facility to process a larger quantity of material in a short time, which prevents effective use of economy of scale because the processing facility would lie idle for much of the year.

In Europe, chicory is used as the source for inulin. In the prior art, inulin is extracted from the chicory roots by soaking the sliced vegetable (cossetts) in hot water, or macerating the roots, then pasteurizing the mash, and filtering off the extract. The resulting extract contains a complex mixture of variously sized chain lengths of fructose linked β (2→1) with, occasionally, an α-D-glucopyranosyl residue at the reducing end of the chain, along with fructose, glucose, sucrose, salts, fats, proteins and amino acids. Heating the mash is considered essential to inactivate inulin-degrading enzymes (inulinases). Proteins and other polar components are then removed by treatment with lime, and/or carbon and diatomaceous earths, then the carbohydrate stream is deionized with ion exchange resins. When a high molecular weight (MW) or large DP inulin fraction is desired, it is typically isolated by ethanol precipitation, crystallization, chromatography or ultrafiltration. These methods were employed to reduce the content of mono- and disaccharides, salts or amino acids at the low MW range, and to reduce the content of proteins, cellulose fibers and other debris at the high MW end. Where ultrafiltration has been applied in the prior art, it was to do a single separation by removing lower MW components as the membrane permeate while retaining the larger MW inulin. For example, Berghofer et al. (cited below) have used ultrafiltration to remove non-inulin components using hollow fiber cartridges with molecular weight cut-off of 2000 or 5000 (Romicon PM2 or PM5 respectively), but this method results in the loss of more than half of the inulin with no evident fractionation.

Where low DP fructooligosaccharides are the desired product, industry today uses either acids or enzymes to break down the high MW fractions to achieve a common quality composition. This requires additional processing to that outlined above to effect the hydrolysis, then remove the enzyme or mineral acid thereby adding to the overall process cost.

The present invention provides a process that obviates the necessity to achieve uniform quality inulin products by the use of techniques to break down the high MW fractions. By taking advantage of the natural distribution of compositions, the present invention also does not restrict recovery of inulin from natural products to a narrow time of harvesting and processing. The processing time can then advantageously be extended over a longer period of time, and thereby allow for gradual processing of the harvest in a smaller facility which is operated continuously all year. As a result, a smaller facility can be employed that doesn't lie idle for a significant proportion of the time. Although the present process can use inulin from any of the commonly available sources, Jerusalem artichoke is better suited for North American agriculture (climate, etc.,).

A further contribution of this invention is the use of membrane filtration to clarify the extract, thereby rendering unnecessary the use of lime and carbonation, or filtration using filtration aids (such as diatomaceous or siliceous earths), and to use a series of membranes with discrete MW cut-off ranges to generate a family or series of purified inulin products useful for human use as food or in therapeutics.

These products comprise a series of fractions having relatively narrow DP ranges, which have different properties that allow them to function in distinct capacities in food systems. For example, the higher DP ranges may better serve as thickeners and/or fat replacers, whereas the lowest DP range are known to have properties in food systems resembling those of sugar (sucrose). Intermediate ranges are not presently available commercially, but are expected to be more like sugar than the larger DP ranges, but to lend more thickening than the low DP ranges such as are obtained by hydrolysis.

Since the average MW of inulin in Jerusalem artichoke tubers (and other sources such as chicory and dahlia tubers) is known to vary with time of harvest (lower MW being favored in later harvested tubers), fractionation and blending can serve to provide a consistent product and permit formulation of "custom" blends for specific applications. Blending allows consistency of composition for any given product, so that the properties are consistent and predictable—this is very important in food processing so that formulation can be the same from batch to batch. Blending also allows preparation of a variety of products having different MW profiles.

BRIEF SUMMARY OF THE INVENTION

The invention provides a process for clarifying crude inulin extract by ultrafiltration and separating an aqueous inulin solution containing carbohydrates having a range of degrees of polymerization into fractions having different average degrees of polymerization which comprises subjecting an aqueous inulin solution to ultrafiltration through a membrane having a predetermined pore size whereby inulin fractions having average degrees of polymerization less than a predetermined value pass through said membrane as permeate and inulin fractions having average degrees of polymerization greater than said predetermined value are collected as retentate.

THE PRIOR ART

The production of inulin from plant materials such as Jerusalem artichoke, dahlia and chicory tubers is normally accomplished by using the following general procedure:

1. Washing the tubers;
2. Chopping, grinding or slicing the tubers;
3. Extracting the inulin from the tubers with water;
4. Treatment with Lime and Carbon Dioxide;

5. Filtering; and

6. Recovering the inulin by evaporation or precipitation.

The inulin may be subjected to heat and/or pH adjustment at some stage in the process to denature inulinase.

The biology, chemistry and analysis of inulin and related substances is reviewed in "*Science and Technology of Fructans*", M. Suzuki and N. J. Chatterton, Eds., CRC Press, Boca Raton, Fla., 1993. A review of technology relating to inulin is found in "*Inulin and Inulin-containing Crops*", S. Fuchs, Ed., Elsevier Science Publishers B. V., Amsterdam, 1993. In particular, see Vogel, "*A PROCESS FOR THE PRODUCTION OF INULIN AND ITS HYDROLYSIS PRODUCTS FROM PLANT MATERIAL*", pp. 65–75; Berghofer et al., "*PILOT-SCALE PRODUCTION OF INULIN FROM CHICORY ROOTS AND ITS USE IN FOODSTUFFS*", pp. 77–84; and Vukov et al., "*PREPARATION OF PURE INULIN AND VARIOUS INULIN-CONTAINING PRODUCTS FROM JERUSALEM ARTICHOKES FOR HUMAN CONSUMPTION AND FOR DIAGNOSTIC USE*", pp. 341–345.

The Berghofer et al. article, cited above, mentions the use of hollow fiber membrane cartridges (Romicon PM-2 and PM-5) for ultrafiltration of aqueous inulin solution. At p. 80 it is stated that "Using an adequate membrane it proved to be possible to retain the high-molecular inulin particles in the retentate while at the same time the greater part of the ash and the nitrogenous substances passed into the permeate." Thus, the procedure was used as a means to purify inulin, rather than to separate it into fractions having different molecular weight distributions.

In the Proceedings of the Fifth Seminar on Inulin, held on Oct. 27, 1995, A. Fuchs, Editor, published by the Carbohydrate Research Foundation (The Hague, Netherlands), on pages 65–66, the following was stated:

"Short-chain inulins should be separated from long-chain inulin by ultrafiltration or nanofiltration on a preparative scale. Therefore, some experiments have been carried out to determine whether it was possible to separate short-chain (DP<4) from long-chain (DP>10) inulin. To this end, various ultrafiltration membranes were tested for their ability to separate inulin from mono- and disaccharides on the one hand, and into various inulin fractions with differing molecular weight distribution on the other. The data on the carbohydrate composition of the filtrates (FIG. 8) show, that no significant separation or fractionation of any kind was possible."

DETAILED DESCRIPTION OF THE INVENTION

As was stated above, the invention provides a process for clarifying a crude inulin extract by membrane filtration and separating an aqueous inulin solution containing carbohydrates having a range of degrees of polymerization into fractions having different average degrees of polymerization which comprises subjecting an aqueous inulin solution to membrane filtration through a membrane having a predetermined pore size whereby inulin fractions having average degrees of polymerization less than a predetermined value pass through said membrane as permeate and inulin fractions having average degrees of polymerization greater than said predetermined value are collected as retentate. The invention is useful, for instance, inulin solutions contains carbohydrates having degrees of polymerization within the range of from 1 (fructose or glucose) to about sixty, into fractions containing pre-selected narrower ranges of degrees of polymerization.

A common problem encountered by practitioners of membrane filtration techniques is fouling of the membrane surface due to the deposition of debris and other components in the feed onto the membrane surface resulting in a decreased flow of permeate through the membrane (flux rate). The method of cross-flow membrane filtration provides a means of accomplishing this by forcing the feed to move orthogonally relative to the direction of permeation, thus constantly sweeping the membrane surface free of foulants. Further techniques used to reduce or avoid fouling include mechanical agitation of the membrane or increasing the shear or turbulence of the feed at the membrane surface. Techniques commonly employed to increase shear include very rapid flow rate of feed across the membrane and/or the use of baffles in the path of the recirculating feed. In choosing the method for clarification of a crude stream (such as the crude inulin extract) any one of several cross-flow configurations (for example, hollow fiber or spiral wound membranes) may be employed insofar as reasonable care is taken to avoid excessive fouling of the membrane surface.

In one aspect, the invention provides a process which comprises the steps of:

(a) recovering inulin from a natural inulin source (e.g., Jerusalem artichoke tubers, chicory tubers, dahlia tubers) to produce thereby a first aqueous solution containing (i) inulin having a range of degrees of polymerization and (ii) impurities, said impurities including at least one member of the group consisting of minerals, amino acids, proteins, fats, cell wall fragments, colloidal matter, and particulate matter such as dirt and, subjecting said first aqueous solution to a denaturing step (e.g., by heating) to denature at least one enzyme selected from the group consisting of inulin degrading enzymes and color forming enzymes to produce a second aqueous solution;

(b) clarifying said second aqueous solution by at least one of the methods taught in the prior art (for example, use of liming and carbonation, centrifugation, filtration with the aid of diatomaceous or siliceous earths, and/or carbon treatment) in combination with cross-flow membrane filtration, or more preferably, by cross-flow membrane filtration alone to remove particulate matter, colloidal matter, colored impurities, or microorganisms to produce a third aqueous solution;

(c) removing ionic impurities and color-forming impurities from said third aqueous solution (such as by treatment with lime and $CO_2$) or more preferably, by passing the third aqueous solution through an absorbent medium such as activated carbon, or adsorbent resins, or a combination of both, to form a fourth aqueous solution; and (d) subjecting the inulin in said fourth aqueous solution into fractions having different average degrees of polymerization which comprises subjecting the fourth aqueous solution to ultrafiltration through an ultrafiltration membrane having a predetermined pore size whereby inulin fractions having average degrees of polymerization less than a predetermined value pass through said membrane as permeate and inulin fractions having average degrees of polymerization greater than said predetermined value are collected as retentate (steps (c) and (d) may be inverted in this sequence);

(e) isolation of dry inulin by any method known to those skilled in the art (such as precipitation, crystallization, spray-drying, drum drying, etc.).

The following is a description of a laboratory scale process for producing inulin fractions from a plant product (Jerusalem artichoke tubers) in accordance with the invention:

Isolation of Inulin from Ground Jerusalem Artichoke Tubers—Option 1

A. Extraction.

Jerusalem artichoke tubers (272.1 kg) were washed and debris removed. Cleaned tubers were segregated into 22–23 kg lots and steamed at atmospheric pressure for about 10 minutes. A small amount of liquid was collected from the tubers (2.57 kg per 22.7 kg of tubers). The mass of the tubers decreased to about 22.2 kg after steaming. City water (mass equal to the initial mass of tubers) was heated to boiling in a steam-jacketed 100-gallon vessel. The steamed tubers were crushed using a meat grinder and the ground tubers weighed (average 20.96 kg per batch). Most of the loss is attributed to water evaporation and, to a lesser extent, incomplete recovery from the grinder. The ground tubers were transferred to the boiling water and extracted for 10–15 minutes. The entire mass was then transferred by ladle or collected from the bottom discharge of the vessel to a pneumatic press lined with muslin cloth to retain the tuber fragments. The hot filtered extract was collected and weighed. The average amount collected was 26.5 kg of extract per 22.7 kg charge of fresh tubers. A total of 317.7 kg extract were collected by this method. The extract was then subjected to high temperature (143.3° C.) for 5–15 sec., bottled in sterile 1-gallon or 2.5-gallon containers and stored refrigerated.

B. Clarification of Raw Jerusalem Artichoke Tuber Extract.

Clarification was accomplished on a recirculating system composed of a feed reservoir, a Wilden M1 (food grade) pump (air supply pressure 90 psi) fitted with a Blacoh Sentry III pulse dampener, and a pressure gauge before the membrane cartridge to measure the inlet pressure. A 2-inch hollow fiber (HF) cartridge with 0.5 mm fiber diameter and 0.93 m$^2$ membrane surface area was positioned vertically and fed from the bottom. Romicon HF-10-20-PM10 (10,000 NMWCO) was used, but other similar products can also serve. A pressure gauge on the discharge side of the membrane indicated the outlet pressure. A needle valve after the gauge was used to add back-pressure to the system. The concentrate was then returned to the feed tank to complete the loop. The permeate was collected in a clean 20 L container. Recirculation rate was 4–6 gpm, inlet pressure 25–30 psig and back pressure 4–5 psig. During the clarification of the raw extract, permeate flux of 100–120 mL/min were observed. When the solution was concentrated to about 20% of the original volume, three cycles of diafiltration[1] were carried out by adding an equal volume of water to the feed to reduce the viscosity and reconcentrating the permeate to the original volume. Approx. 114 L of extract were concentrated to about 20 L. Approx. 154 L of permeate were collected, including 60 L from three cycles of diafiltration. Brix measurements taken of the permeate were initially about 10–12° Bx, then decreased to 6° Bx prior to the diafiltration. During diafiltration the concentration of inulin in the permeate decreased further to 0.2° Bx. The concentrate showed a final reading of 3–4° Bx. In addition to effecting a clarification of the extract, this hollow fiber filtration procedure removes the very high (DP>40) molecular weight fraction of the inulin which is only sparingly soluble in water.

[1] "Diafiltration" is an operating mode of ultrafiltration. In diafiltration, pure solvent is added to the system continuously or as a batch, followed by additional removal of permeate. In this way, a solution of macrosolutes can be washed free of essentially all micro-solute. Stated another way, "diafiltration" is simultaneous dilution and permeation.

C. Ultrafiltration of Clarified Extract (fractionation of low DP inulin).

The permeate collected from the HF clarification (a total of 153.75 kg containing 1.77 kg inulin) was recirculated through a spiral wound (SW) membrane cartridge (DESAL G10, 2.5K NMWCO) ["NMWCO" represents nominal molecular weight cut-off] with approximately 2.6 m$^2$ membrane area. A total of 101.65 kg containing 10.7 kg of carbohydrates were combined in the mixing tank and recirculation established. Samples of the concentrate (C1, 10.5° Bx) and permeate (P1, 3.3° Bx) were withdrawn. Concentration was continued for 49 minutes to about 65 liters. An additional 35.5 kg containing 0.95 kg carbohydrates were added, the feed again concentrated to about 70 L and the final 16.6 kg containing 0.13 kg carbohydrates were added to the feed. After 33 min, the concentrate (C2, 15.8° Bx) and permeate (P2, 3.1° Bx) were sampled. Concentration was continued for 1.5 hours to a final volume of ca. 10 L. The concentrate was diluted with 18.2 kg deionized water and diafiltration continued to a final volume of ca 10 L. The retentate was again diluted with 18.1 kg deionized water and the concentrate (C3, 24° Bx) and permeate (P3, 6° Bx) sampled. Diafiltration was resumed for a further 35 min to a final volume of about 10 L of concentrate. The feed was again diluted with a third portion of deionized water (18.1 kg) and diafiltration continued for a further 30 min to a final 13.75 kg (24.4° Bx). Permeate (P4) concentration was 2.5° Bx. The permeates from the diafiltration were kept separate from the initial permeate. The permeate was collected in ten 20-L containers and stored frozen overnight. Calculated average flux rate was 362.6 L/m$^2$/day.

The resulting concentrate (i.e., retentate) had a MW distribution which was heavily shifted toward the higher MW portion of a narrow range, as shown in TABLE I. The MW distributions in this experiment and in the experiments whose results are reported in TABLES II and III were determined by size exclusion chromatography[2].

[2] Size exclusion chromatography.

A system composed of a Waters 510 pump, Waters Gradient controller, WISP Autosampler, a 3-column system (Phenomenex PolySep P3000, P2000, and P1000 (7.8×300 mm, placed in order of elution), a Shodex RI-71 detector, and a miniDAWN MALLS detector was employed. Data was processed by the ASTRA for WINDOWS v. 4.00. Mobile phase was isochratic 0.05% NaN$_3$ in purified water, and filtered through a 0.2μfilter. Flow rate was 0.6 mL/min.

TABLE I

| DP RANGE | Sample Feed (% dry matter) | Intermed. MW cut Retentate (% dry matter) (2.5K NMWCO) | Cumul. permeate (2.5K NMWCO) (% dry matter) |
|---|---|---|---|
| DP 6–25 | 37.01% | 72.56% | 0.00% |
| DP~4–7 | 23.94% | 21.03% | 40.30% |
| DP~4 | 12.17% | 5.45% | 23.44% |
| DP 3 | 10.41% | 0.97% | 19.84% |
| sucrose | 1.52% | 0.00% | 7.06% |
| monosacc. | 2.68% | 0.00% | 4.12% |
| salts | 3.73% | 0.00% | 5.25% |

The lower DP's (1–4) were removed (i.e., passed through as permeate) almost completely and some slightly larger chains (DP 5–8) were also removed to a lesser extent to give a retentate product with DP approximately 6–25 as 72% of the inulin mass, DP 4–7 at 21%, 5.5% DP 4, and less than 1% DP 3. No detectable amounts of sucrose or monosaccharides were present. The permeate contained primarily DP 4–7 (40%), roughly equal amounts of DP 4 (23%) and 3 (20%) and lesser amounts of sucrose (DP 2), (7%) monosaccharides (4%) and salts (5%).

The composition of the concentrate and permeate changed during the permeation depending on the extent of ultrafiltration or diafiltration, as is seen in TABLE II, below:

TABLE II 2.5K NMWCO permeate change as a function of concentration

| peak # | P1 (% dry matter) | P2 (% dry matter) | P3 (% dry matter) | P4 (% dry matter) |
|---|---|---|---|---|
| DP 6–25 | 0.00% | 0.00% | 38.61% | 49.49% |
| DP~4–7 | 31.09% | 36.83% | 26.02% | 24.34% |
| DP~4 | 23.11% | 20.96% | 18.94% | 17.35% |
| DP 3 | 17.76% | 19.80% | 14.39% | 8.81% |
| sucrose | 18.75 | 7.29% | 0.00% | 0.00% |
| monosacc. | 9.28% | 5.82% | 0.32% | 0.00% |
| salts | 0.00% | 9.30% | 1.71% | 0.00% |

Thus it became apparent that by judicious timing of the extent of concentration it was possible to tailor the composition of the concentrate to obtain a desired composition in the permeate. This would be advantageous in producing a variety of products from a single feed. Further, it permits the practitioner to obtain a product substantially free of undesired calorific components (DP 1 and 2) with a single membrane system, rather than requiring two separate membrane treatment steps.

The permeate of the G10 membrane was subjected to further ultrafiltration on a DESAL G5 (SW, 2540, 2.6 ft$^2$, 1K NMWCO) to remove the lower MW components. The first 7 (of 10) 5-gal. drums of G10 permeate were added to the feed tank. Recirculation was established and when the permeate began to flow, feed and permeate were sampled. The feed was concentrated to about 45 L and the concentrate and permeate were again sampled. Drum 8 was added to the concentrate when the level reached 40 L and the feed concentrated again to 40 L. The same procedure was followed with drum 9 and 10. Samples of feed (17.2° Bx) and permeate (0.9° Bx) were taken after the last drum of feed was concentrated to 20 L. Concentration continued to 15 L, the feed was diluted with 10 kg deionized water and diafiltration continued to a final mass of 16.4 kg concentrate (28.5° Bx). The average flux rate was calculated at 240.3 L/m$^2$/day. The resulting concentrate contained significantly reduced levels of sucrose, monosaccharides and salts, as seen in TABLE III, below:

TABLE III

| peak # | Cumul. permeate (2.5K NMWCO) | Low MW cut Retentate (1K NMWCO) |
|---|---|---|
| DP 6–25 | 0.00% | 0.00% |
| DP~4–7 | 40.30% | 50.83% |
| DP~4 | 23.44% | 21.40% |
| DP 3 | 19.84% | 22.23% |
| sucrose | 7.06% | 2.43% |
| monosacc. | 4.12% | 0.88% |
| salts | 5.25% | 2.24% |

D. Decolorization and Deionization.

To 26.5 lb. of extract (either prior or post membrane clarification/separation; in this case being performed after membrane separations), having a 27.5% Brix reading, are added a slurry of 578.2 g of calcium hydroxide (lime) suspended in 1.16 kg water. Gaseous carbon dioxide is added to the mixture with vigorous stirring. The inputs of lime and carbon dioxide are regulated in such a manner as to control the pH between about 10.4 and 10.7; initial addition of lime raised pH of extract, originally at about 5.5, to 11.0, and resulted in the formation of a flocculent precipitate as well as formation of a bright yellow green coloration. After completion of the lime addition, the pH was adjusted to about 10.4 by carbon dioxide addition, and the mixture was allowed to stand overnight. After standing overnight, the pH was reduced to neutral by further addition of carbon dioxide.

Decolorizing carbon (303 g KBFF powdered carbon) was added to the limed mixture; final mixture mass was 33.0 lb. with a Brix reading of 24 degrees. The resulting mixture was centrifuged to remove the bulk of the precipitates. The clarification of the mixture was accomplished using a 500K NMWCO HF membrane with three cycles of diafiltration. Approximately 74% of the carbohydrate content was recovered.

Centrifugation conditions could be configured to effectively remove the carbon as well, but this would involve use of large quantities of filter aid such as Celite. It is more convenient to remove the bulk of the precipitate by centrifugation, and subsequently pass the resulting filtrate through a shell-and-tube or hollow fiber membrane of suitable porosity to remove the residual carbon or microbial contamination.

The clear solution was passed over a column of Dowex Monosphere 550A (Chloride form) at 0.12 bed volumes per minute. Approximately 64% of the dissolved solids (based on degrees Brix) was recovered from the resin. The effluent was immediately passed through a column of mixed bed resin (Dowex MR-3) at the same rate as the previous column. pH and conductivity were monitored to ensure the pH did not go below 4 and the conductivity remained less than 1 mS. As the resin was exhausted, the pH dropped quickly from 5 to 3 and the conductivity rose from 0.1 to 0.3 mS. A fresh resin column was used to continue the process. Approximately 64% of the dissolved solids was recovered from this step based on Brix determination.

E. Isolation of Solid Inulin.

The solution from the previous step containing 7.8 pounds of inulin was concentrated by rotary evaporation to a concentration of 28.5° Brix. A portion of this solution was spray-dried on a Niro spray-drier using an inlet temperature of 195° C. and outlet temperature of 120° C. at a feed rate of 2.5 kg/hour. Dried inulin (6.76 lb.) was recovered as a fine granular product which was moderately hygroscopic.

Isolation of Inulin from Ground Jerusalem Artichoke Tubers—Option 2

A. Extraction.

The extraction was carried out as described in Option 1 above.

B. Clarification of raw extract.

Raw extract (15 kg, 10° Brix) was clarified using a 500K NMWCO HF module (1.5×25 in.) with 3 sq. ft. of membrane and 1.0 mm lumen diameter (A/G Technology, Inc.). Recirculation was approx. 6 gpm. Inlet pressure was 30 psig and outlet pressure 3–5 psig. Initial flux rate was 256 mL/min which decreased to 194 mL/min at a volume recovery of 80%. The concentrate was subjected to diafiltration until the permeate concentration decreased to 1.5° Brix. This procedure was repeated until 126.2 kg of permeate (including the diafiltration permeate) were obtained. The combined permeate was concentrated by cross-flow filtration using a 1K NMWCO SW module (DESAL G5, 2.5×40 in., 2.6 m$^2$) to 49.5 kg to facilitate storage and reduce the concentration of low molecular weight contaminants. This is advantageous in reducing the need for regeneration or replacement of ion exchange resins and/or activated carbon adsorbents later in the process.

C. Continuous Deionization and Decolorization of Clarified Extract.

Concentrated permeate was diluted to 10° Brix processed in a continuous manner by passing sequentially through four columns (4×24 in.) packed with the following adsorbents in the order of use: 1. Mitsubishi P308 (Cl⁻); 2. Dowex Monosphere 550A (OH⁻); 3. Dowex Marathon C cation exchange (H⁺); 4. Darco 12x20LI granular activated carbon (GAC). The eluted solution is monitored on the basis of absorbance at 268 nm and conductivity. The order of adsorbents may be varied to meet the needs of the process or product specifications. In the present case, the use of the chloride resin as the first step is advantageous in that it effectively removes color and exchanges anions easily which are difficult, if not impossible, to remove with the hydroxide form of the resin alone. Positioning the hydroxide resin before the acid resin also avoids or minimizes pH excursions into the acid region which are damaging to the polyfructan.

D. Fractionation of Deionized/Decolorized Inulin.

The underlying principle for this operation is the separation of different chain length populations of inulin using a series of membranes. Whereas this might normally be accomplished by commercial scale size exclusion chromatography, the use of a series of membranes, suitably chosen for their empirically determined molecular weight cut-off, can provide a more economical means of rendering relatively narrow or broad molecular weight populations, as desired, with different physical properties. A typical sequence of membranes may be in ascending or descending order of NMWCO, however a mixed order of NMWCO can provide a slightly different mixture of chain lengths than would be accomplished by a strictly sequential use of increasing or decreasing NMWCO membranes.

1. Preparative Fractionation of Inulin with Diafiltration: Measurement of Percent Rejection.

A solution of purified inulin (55.8 kg, 9.6° Brix) was concentrated using a membrane module (2.5×40 in.) with a nominal 3.5K NMWCO. Recovered 9.36 kg (17.4° Brix) of concentrate C-1, and 46.4 kg of permeate P-1 (5.2° Brix). Concentrate C-1 (8.84 kg) was diluted to 30.6 kg and reconcentrated with a membrane module of 10K NMWCO. The final concentrate C-2 (6.1 kg, 8.7° Brix) was stored frozen. The Permeate P-2 was combined with P-1. The combined permeates were concentrated on a membrane module of 2.5K NMWCO. The concentrate C-3 (6.18 kg, 10.4° Brix) was frozen. Permeate P-3 (58.6 kg, 2.9° Brix) was concentrated with a membrane module of 1K NMWCO to afford concentrate C-4 (10.9 kg, 9.3° Brix) which was also stored frozen. Permeate P-4 (47.7 kg, 0.5° Brix) was discarded.

The table below summarizes the percent rejection of inulin components measured for each membrane. The percent rejection[3] (%R) was calculated according to the formula:

$$\%R = [\log(C_r/C_o)/\log(V_o/V_r)] \times 100\%$$

where $C_r$ is the concentration in the retentate, $C_o$ is that in the feed, $V_r$ is the volume of retentate, and $V_o$ the volume of feed. If a component was undetectable in the feed but was measurable in the concentrate, the calculated % rejection was very much greater than 100%, but the value in the table below was entered as 100%. Similarly, some of the very low DP components (DP 1, 2, and 3–4) were calculated to have negative % rejection on the 10K NMWCO module, but the value entered was 0% rejection.

[3] Matson, S. L., "Membrane Separations"; Chapter 8 in Membrane Separations Technology. Principles and Applications. R. D. Noble and S. A. Stern (eds.), Elsevier, 1995. Pp. 353–413, especially page 393.

TABLE IV

Calculated % Rejection for Inulin Components by Membranes with Distinct Nominal Molecular Weight Cut-offs (NMWCO).

| DP | 10K NMWCO | 3.5K NMWCO | 2.5K NMWCO | 1K NMWCO |
|---|---|---|---|---|
| 245–405 | 100% | 100% | 100% | 100% |
| 148–245 | 100% | 100% | 100% | 100% |
| 89–148 | 100% | 100% | 100% | 100% |
| 54–89 | 100% | 100% | 100% | 100% |
| 33–54 | 100% | 100% | 100% | 100% |
| 20–33 | 69.95% | 87.57% | 100% | 100% |
| 12–20 | 49.72% | 76.27% | 100% | 100% |
| 7–12 | 37.6% | 71.40% | 99.72% | 100% |
| 4–7 | 35.45% | 55.18% | 77.98% | 72.37% |
| 3–4 | 0.00% | 58.63% | 68.14% | 85.29% |
| 3 | 0.97% | 17.81% | 51.18% | 81.30% |
| 2 | 0.00% | 13.08% | 34.03% | 82.64% |
| 1 | 0.00% | 0.80% | 12.69% | 54.75% |

2. Isolation of Inulin Fractions.

In this process, an initial charge of inulin from chicory was passed sequentially through four different membrane fractionation stages (10K, 3.5K, 2.5K, 1.0K NMWCO) to give four products with distinct compositions in terms of the molecular weight distribution of inulin.

A purified solution of inulin in water (10% w/w; 100.21 kg) was heated to 40° C. to dissolve the high molecular weight material. The solution was subjected to ultrafiltration through a spiral wound membrane module (2.5"×40"; 10K NMWCO) until 34.84% of the original mass remained. The concentrate was subjected to three cycles of diafiltration (one cycle consists of dilution with an equal mass of water followed by concentration to the original volume). The remaining concentrate after diafiltration (10KC1) was stored frozen.

The combined permeates from the previous step were concentrated by cross-flow filtration using a spiral wound membrane module (2.5"×40"; 3.5K NMWCO) until 9.93% of the feed mass remained as concentrate. The concentrate was then subjected to three cycles of diafiltration as above to yield concentrate 3.5KC2.

The combined permeates from 3.5KC2 were concentrated to about half the original volume using a 1K NMWCO membrane module. The permeate was discarded and the concentrate fractionated further using a 2.5K NMWCO module. The concentrate was 10.2% of the original feed mass, and was subjected to diafiltration as described previously to afford concentrate 2.5KC3. The permeates from the concentration and diafiltration were finally concentrated on a 1K NMWCO membrane module (8.07% of original mass) and subjected to three cycles of diafiltration to afford 1.0KC4. The permeates from this last step were discarded. The percent composition of each concentrate is tabulated below.

TABLE V

Composition of Inulin Fractions Obtained By Cross-flow membrane filtration

| DP Range | 10KC1 | 3.5KC2 | 2.5KC3 | 1.0KC4 |
|---|---|---|---|---|
| 33–54 | 1.93% | 3.60% | 0% | 0% |
| 20–33 | 11.73% | 12.58% | 2.27% | 0% |
| 12–20 | 23.71% | 22.25% | 9.95% | 0% |

TABLE V-continued

Composition of Inulin Fractions Obtained By Cross-flow membrane filtration

| DP Range | 10KC1 | 3.5KC2 | 2.5KC3 | 1.0KC4 |
|---|---|---|---|---|
| 7–12 | 25.92% | 26.06% | 22.22% | 5.61% |
| 4–7 | 17.88% | 19.86% | 27.79% | 14.72% |
| 3–4 | 6.98% | 7.65% | 14.36% | 15.02% |
| 3 | 4.26% | 3.88% | 8.46% | 17.73% |
| 2 | 3.73% | 2.24% | 6.76% | 32.53% |
| 1 | 3.85% | 1.89% | 8.20% | 14.40% |

What is claimed is:

1. A process for separating a first aqueous inulin solution containing carbohydrates having a range of degrees of polymerization into fractions having different average degrees of polymerization which comprises subjecting an aqueous inulin solution to ultrafiltration through a membrane having a predetermined pore size whereby inulin fractions having average degrees of polymerization less than a predetermined value pass through said membrane as permeate and inulin fractions having average degrees of polymerization greater than said predetermined value are collected as retentate.

2. The process of claim 1 wherein the ultrafiltration membrane has a spiral wound configuration.

3. The process of claim 1 wherein said first aqueous inulin solution contains carbohydrates having degrees of polymerization within the range of from 1 (fructose or glucose) to about sixty.

4. The process of claim 1 wherein the first aqueous inulin solution contains inulin derived from Jerusalem artichoke, chicory or dahlia.

5. The process of claim 1 wherein said predetermined pore size is arranged and constructed to pass therethrough inulin fractions having molecular weights selected from the group consisting of about 1K, 2.5K, 3.5K and 10K.

6. The process of claim 1 wherein said process includes a step wherein the first aqueous inulin solution is clarified by membrane filtration prior to subjecting said first aqueous inulin solution to ultrafiltration through a membrane having a predetermined pore size.

7. The process of claim 6 wherein the said membrane filtration is carried out using a hollow fiber membrane.

8. The process of claim 6 wherein the said membrane filtration is carried out using a spiral wound membrane.

9. A process which comprises the steps of:
   (a) recovering inulin from a natural inulin source to produce thereby a first aqueous solution containing (i) inulin having a range of degrees of polymerization and (ii) impurities, said impurities including at least one member of the group consisting of minerals, amino acids, proteins, fats, cell wall fragments, colloidal matter, and particulate matter;
   (b) subjecting said first aqueous solution to a denaturing step to denature at least one enzyme selected from the group consisting of inulin degrading enzymes and color forming enzymes to produce a second aqueous solution;
   (c) clarifying said second aqueous solution to remove particulate matter, colloidal matter and microorganisms to produce a third aqueous solution;
   (d) removing ionic impurities and color-forming impurities from said third aqueous solution to form a fourth aqueous solution; and
   (e) subjecting the inulin in said fourth aqueous solution into fractions having different average degrees of polymerization which comprises subjecting the fourth aqueous solution to ultrafiltration through a membrane having a predetermined pore size whereby inulin fractions having average degrees of polymerization less than a predetermined value pass through said membrane as permeate and inulin fractions having average degrees of polymerization greater than said predetermined value are collected as retentate.

10. The process of claim 9 wherein step (b) is a heating step.

11. The process of claim 9 wherein step (c) comprises passing the second aqueous solution through an appropriate filter medium.

12. The process of claim 9 wherein step (d) comprises passing the third aqueous solution through an absorbent medium.

13. A process for separating a first aqueous inulin solution containing carbohydrates having a range of degrees of polymerization into fractions having different average degrees of polymerization which comprises subjecting the first aqueous inulin solution to ultrafiltration through more than one membrane having predetermined pore sizes whereby inulin fractions having average degrees of polymerization less than a predetermined value pass through the membranes as permeate and inulin fractions having average degrees of polymerization greater than said predetermined value are collected as retentate.

14. A process which comprises the steps of:
   (a) recovering inulin from a natural inulin source to produce thereby a first aqueous solution containing (i) inulin having a range of degrees of polymerization and (ii) impurities, said impurities including at least one member of the group consisting of minerals, amino acids, proteins, fats, cell wall fragments, colloidal matter, and particulate matter;
   (b) subjecting said first aqueous solution to a denaturing step to denature at least one enzyme selected from the group consisting of inulin degrading enzymes and color forming enzymes to produce a second aqueous solution;
   (c) clarifying said second aqueous solution to remove particulate matter, colloidal matter and microorganisms to produce a third aqueous solution;
   (d) removing ionic impurities and color-forming impurities from said third aqueous solution to form a fourth aqueous solution; and
   (e) subjecting the inulin in said fourth aqueous solution into fractions having different average degrees of polymerization which comprises subjecting the fourth aqueous solution to ultrafiltration through more than one membrane having predetermined pore sizes whereby inulin fractions having average degrees of polymerization less than a predetermined value pass through the membranes as permeate and inulin fractions having average degrees of polymerization greater than said predetermined value are collected as retentate.

* * * * *